United States Patent
Germiquet et al.

(10) Patent No.: US 10,751,568 B2
(45) Date of Patent: Aug. 25, 2020

(54) METHOD OF DETECTING AND CALCULATING HEIGHT OF A JUMP

(71) Applicant: The Swatch Group Research and Development Ltd, Marin (CH)

(72) Inventors: Christophe Germiquet, Preles (CH); Yvan Ferri, Lausanne (CH); Michel Willemin, Preles (CH)

(73) Assignee: The Swatch Group Research and Development Ltd, Marin (CH)

( * ) Notice: Subject to any disclaimer, the term of this patent is extended or adjusted under 35 U.S.C. 154(b) by 193 days.

(21) Appl. No.: 15/831,573

(22) Filed: Dec. 5, 2017

(65) Prior Publication Data
US 2018/0161622 A1    Jun. 14, 2018

(30) Foreign Application Priority Data

Dec. 12, 2016  (EP) .................................... 16203363

(51) Int. Cl.
*A63B 24/00* (2006.01)
*G01B 15/02* (2006.01)
(Continued)

(52) U.S. Cl.
CPC .......... *A63B 24/0003* (2013.01); *G01B 15/02* (2013.01); *G01C 5/00* (2013.01);
(Continued)

(58) Field of Classification Search
CPC .... G01C 5/06; G01C 5/00; A63B 5/00; A63B 24/0003; A63C 2203/18
See application file for complete search history.

(56) References Cited

U.S. PATENT DOCUMENTS 5,636,146 A * 6/1997 Flentov ................ A42B 3/0433
                                                                368/10
7,433,805 B2 * 10/2008 Vock .......................... G01P 3/50
                                                                235/444
(Continued)

FOREIGN PATENT DOCUMENTS

FR         3051373 A1 * 11/2017 ........... A61B 5/1122
JP      2007309941 A  * 11/2007 ............... G01C 5/06
RU      2 570 667 C1    12/2015

OTHER PUBLICATIONS

S. Zihajehzadeh et al., Integration of MEMS Inertial and Pressure Sensors for Vertical Trajectory Determination, Mar. 2015, IEEE Transactions on Instrumentation and Measurement, vol. 64, No. 3, pp. 804-814.*

(Continued)

*Primary Examiner* — Mischita L Henson
(74) *Attorney, Agent, or Firm* — Oblon, McClelland, Maier & Neustadt, L.L.P.

(57) ABSTRACT

A method of detecting and calculating height of a jump performed by an individual including detection of a reception subsequent to the jump is described. The detection includes a sub-step of detecting a pressure spike of amplitude greater than a first threshold amplitude, within pressure measurements provided by a pressure sensor embedded aboard a watch worn on the wrist of the individual. Also described is calculation of a height of the jump by differencing a starting altitude corresponding to a last stable pressure measured before the pressure spike and a finishing altitude corresponding to a first stable pressure measured after the pressure spike via the pressure sensor, a stable pressure being defined as a pressure whose variations do not exceed 0.1 hectopascals for at least 2 seconds.

4 Claims, 2 Drawing Sheets

(51) Int. Cl.
*G01C 5/00* (2006.01)
*G04F 8/08* (2006.01)
*G01C 5/06* (2006.01)
*G04F 10/00* (2006.01)
*A63B 5/00* (2006.01)
*G01P 15/18* (2013.01)

(52) U.S. Cl.
CPC ............ *G01C 5/06* (2013.01); *G04F 8/08* (2013.01); *G04F 10/00* (2013.01); *A63B 5/00* (2013.01); *A63C 2203/18* (2013.01); *G01P 15/18* (2013.01)

(56) References Cited

U.S. PATENT DOCUMENTS

2002/0116147 A1 8/2002 Vock et al.
2004/0225467 A1 11/2004 Vock et al.
2008/0125288 A1* 5/2008 Case ................ A41D 1/002
  482/1
2013/0044043 A1* 2/2013 Abdollahi ............ A42B 3/0433
  345/8
2016/0136482 A1 5/2016 Askew, Jr. et al.

OTHER PUBLICATIONS

Seiji Kitamura et al., 3D measurement of lower body posture during jumping using inertial sensor, Aug. 20-23, 2012, SICE Annual Conference 2012, p. 295-300 (Year: 2012).*

Masaki Oikawa et al., Design and Implementation of Ski Jumper's Motion Monitor System by Terrestrial Magnetism and Acceleration Sensors, 2010, IEEE Computer Society, 13th International Conference on Network-Based Information Systems, p. 78-85 (Year: 2010).*

European Search Report dated May 18, 2017 in European application 16203363.3, filed on Dec. 12, 2016 (with English Translation of Categories of Cited Documents).

* cited by examiner

METHOD OF DETECTING AND CALCULATING HEIGHT OF A JUMP

This application claims priority from European patent application No. 16203363.3 filed on Dec. 12, 2016, the entire disclosure of which is hereby incorporated herein by reference.

FIELD OF THE INVENTION

The invention pertains to a method of detecting and calculating height of a jump. The method is particularly suitable for detecting and calculating height of a jump performed globally downwards (according to a terrestrial frame of reference) and without the aid of means of displacement to gather pace before the jump. Such is in particular the case for a jump into the water, for example from a cliff, a diving board or a bridge.

By height, what is meant is the difference between the altitude of the individual or of the sportsperson at the moment they begin the jump, and the altitude of the sportsperson on reception thereof. In the case of a jump into the water, reception refers to the entry of the sportsperson into the water.

By globally downwards jump, we do not exclude cases where the sportsperson would take a starting leap causing them to depart upwards before being pulled downwards by gravity, if the height travelled upwards is negligible with respect to the height travelled downwards.

By means of displacement making it possible to gather pace before the jump, what is meant are means external to the sportsperson and in contact with the ground before the jump, such as a bicycle, a skateboard, skis, a snowboard, roller blades, etc.

BACKGROUND OF THE INVENTION

Document US2002/0116147 discloses a method for detecting a jump by means of a measurement unit mounted on displacement means used by a sportsperson to gather pace before the jump and which are in contact with the ground before and after the jump. The displacement means are for example skis or a snowboard. A calculation unit, for example a watch worn by the sportsperson, makes it possible to determine and to display parameters of the jump, in particular the duration of the jump, on the basis of the measurements carried out by the measurement unit. More precisely, the measurement unit logs vibrations of the displacement means, so as to detect when the displacement means leave the ground and return to the ground, thereby making it possible to detect a jump.

This method exhibits the drawback of being usable only when the sportsperson uses displacement means subjected to vibrations in contact with the ground and allowing him or her to gather speed before the jump. This device is therefore not suitable for jumps performed without means of this kind.

SUMMARY OF THE INVENTION

The aim of the present invention is to alleviate the drawback cited above.

For this purpose, the invention pertains to a method of detecting and calculating height of a jump performed by an individual, comprising the following steps: a detection of a reception subsequent to the jump, this step comprising a sub-step of detecting a pressure spike of amplitude greater than a first threshold amplitude, within pressure measurements provided by a pressure sensor embedded aboard a watch worn on the wrist of the individual, and a calculation of a height of the jump by differencing a starting altitude corresponding to a last stable pressure measured before the pressure spike and a finishing altitude corresponding to a first stable pressure measured after the pressure spike. A stable pressure is defined as a pressure whose variations do not exceed 0.1 hectopascals for at least 2 seconds.

The invention exploits the finding that a reception following a jump is at the origin of a large pressure spike observed within the data measured by a pressure sensor or an altimeter. A detection of a pressure spike or altitude spike is therefore evidence of a reception on the ground.

When a reception has been detected, the pressure measurements logged during the instants preceding and following this reception are used to calculate the height of the jump. Indeed, in the case of a jump performed globally downwards and without the aid of displacement means to gather pace before the jump, the pressure measurements exhibit two stable phases: one preceding the jump, the other following reception after the jump. Naturally, during these stable phases, the instantaneous pressures may vary, but the pressure measurements oscillate around a stable value.

In addition to the aforementioned characteristics, the method according to the invention may comprise the following characteristics, taken alone or in combination according to all technically possible combinations.

In a nonlimiting embodiment, the step of detecting a reception also comprises a sub-step of detecting an acceleration spike of amplitude greater than a second threshold amplitude, on the basis of acceleration measurements provided by a three-axis accelerometer embedded aboard the watch, and a sub-step of comparing the instant associated with the acceleration spike and the instant associated with the pressure spike.

By acceleration measurement, what is meant is the norm of an acceleration vector with 3 components, that is to say the square root of the sum of the squares of the components.

The aforementioned advantageous characteristics exploit the finding that a reception following a jump is at the origin of a large acceleration spike observed within the data measured by a triaxial accelerometer. A detection of an acceleration spike is therefore evidence of a reception which makes it possible to confirm that a jump has indeed occurred by correlation with the pressure spike.

In a nonlimiting embodiment, the second threshold amplitude is greater than 2 g, where g is the acceleration of gravity at the Earth's surface, that is to say 9.80665 m·s$^{-2}$.

In a nonlimiting embodiment, the first threshold amplitude is greater than 10 hectopascals.

SUMMARY DESCRIPTION OF THE DRAWINGS

Other particularities and advantages will emerge clearly from the description given thereof hereinafter, by way of wholly nonlimiting indication, with reference to the appended drawings, in which.

DETAILED DESCRIPTION OF THE PREFERRED EMBODIMENTS

Figure 1:
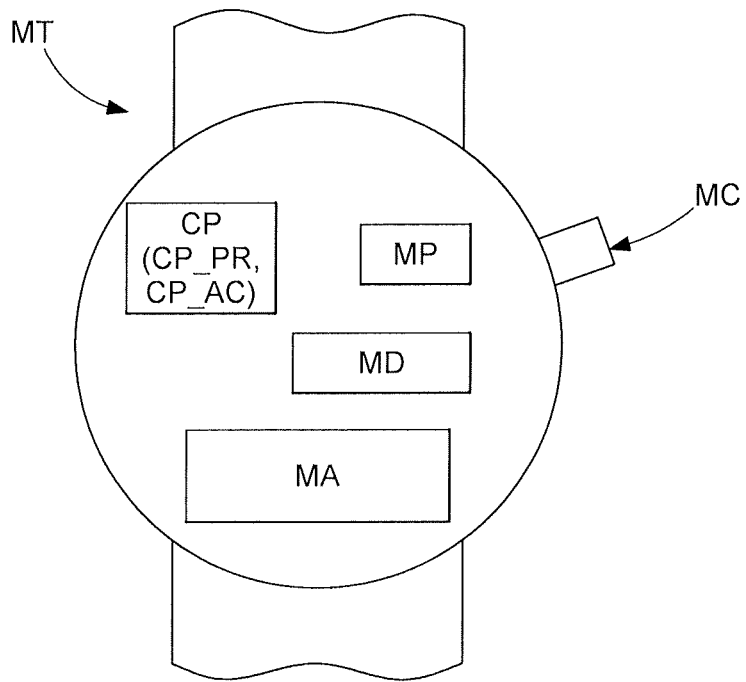
FIG. 1 represents an electronic watch allowing the implementation of the method according to a nonlimiting embodiment of the invention.

In a nonlimiting embodiment, the method METH according to the invention is implemented entirely by an electronic watch MT worn by an individual carrying out a jump. In a nonlimiting embodiment shown in FIG. 1, the watch MT comprises:

- a set of sensors CP, including an accelerometer CP_AC and a pressure sensor CP_PR (or altimeter)
- a memory MD for recording measurements carried out by the sensors CP. The measurements are advantageously recorded in the memory in a sliding manner, according to the FIFO ("first in, first out") principle
- a microprocessor MP for processing the information contained in the memory MD
- digital or analogue display means MA, for displaying the results of the calculations carried out by the microprocessor MP
- mechanical, electronic or touch-based means of activation MC, of the sensors CP, of the memory MD, of the microprocessor MP and of the display means MA, making it possible to trigger the method PR.

Figure 2:
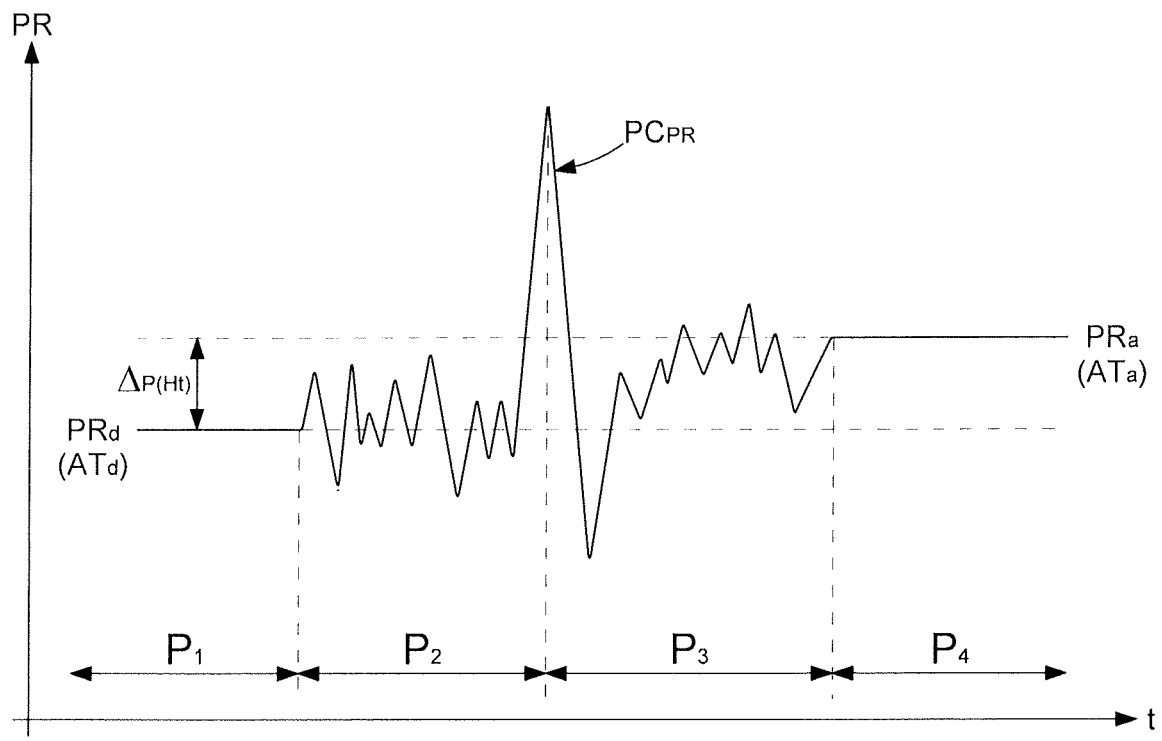
FIG. 2 shows a curve representing pressure measurements in the course of a jump into the water from a cliff.

FIG. 2 shows a curve representing the pressure PR measured by the pressure sensor CP_PR of the watch MT as a function of the time t, and in particular during four phases $P_1$, $P_2$, $P_3$ and $P_4$.

In the first phase $P_1$, the individual is in contact with the ground. During this first phase, the pressure $PR_d$ measured by the pressure sensor CP_PR is substantially constant. This pressure makes it possible to calculate a so-called starting altitude $AT_d$. Next, the individual takes off from the ground and rapidly goes into free fall, this corresponding to the second phase $P_2$. Thereafter, the individual enters the water (they are received), and then swims so as to exit the water, this corresponding to the third phase $P_3$. The beginning of the third phase $P_3$ is recognizable by virtue of the pressure spike $PC_{PR}$ visible on the first curve. Finally, in a fourth phase $P_4$, the individual exits the water and is again in contact with the ground. During this fourth phase $P_4$, the pressure $PR_a$ measured by the pressure sensor CP_PR is substantially constant. This pressure makes it possible to calculate a so-called finishing altitude $AT_a$.

Figure 3:
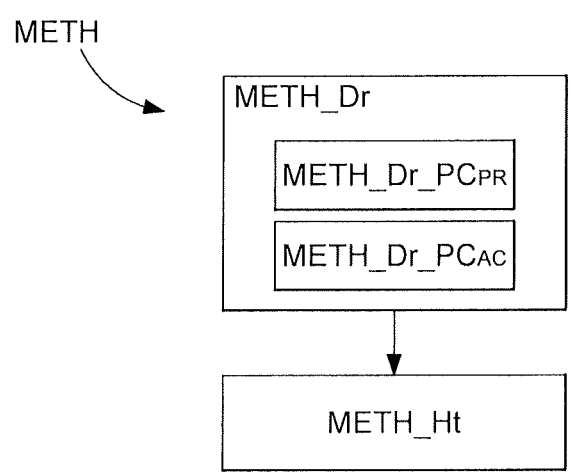
FIG. 3 shows a functional chart representative of the steps of the method according to a nonlimiting embodiment of the invention.

A first step of the method METH according to the invention consists in detecting that a jump has been performed (step METH_Dr in FIG. 3). More particularly, the detection step METH_Dr comprises a first sub-step METH_Dr_$PC_{PR}$ consisting in detecting a pressure spike $PC_{PR}$ in the measurements provided by the pressure sensor CP_PR. Indeed, when a jump is performed, a pressure spike $PC_{PR}$ is observed at the instant corresponding to the individual's reception on the ground. When such a spike $PC_{PR}$ is detected, it is compared with a threshold value beyond which it is decided that the spike $PC_{PR}$ does indeed correspond to a reception on the ground following a jump.

In one embodiment, to confirm that this pressure spike $PC_{PR}$ does indeed correspond to a reception following a jump, the detection step METH_Dr also comprises a second sub-step METH_Dr_$PC_{AC}$ consisting in detecting an acceleration spike $PC_{AC}$ in the measurements provided by the accelerometer CP_AC. Such an acceleration spike $PC_{AC}$ ought to be logged at an instant substantially identical to that at which the pressure spike $PC_{PR}$ was detected. The instants corresponding to the pressure spike $PC_{PR}$ and to the acceleration spike $PC_{AC}$ are therefore compared. If the norm of the difference between these instants is less than a threshold value, for example 0.5 seconds, then it is decided that the spikes $PC_{PR}$, $PC_{AC}$ do indeed correspond to a reception on the ground following a jump.

A second step of the method METH according to the invention consists in calculating the height Ht of the jump (step METH_Ht). Accordingly, the finishing altitude $AT_a$ is deducted from the starting altitude $AT_d$. It is noted that the starting altitude $AT_d$ is calculated by means of the last stable pressure $PR_d$ measured before reception, that is to say the stable pressure logged during the first phase $P_1$. The finishing altitude $AT_a$ is calculated by means of the first stable pressure $PR_a$ measured after reception, that is to say the stable pressure logged during the fourth phase $P_4$.

Of course, the present invention is not limited to the example illustrated but is subject to diverse variants and modifications which will be apparent to the person skilled in the art.

What is claimed is:

1. A method of detecting and calculating height of a jump performed by an individual using a watch, comprising:
   detecting a reception subsequent to the jump, the detecting including a sub-step of detecting a pressure spike of amplitude greater than a first threshold amplitude, within pressure measurements provided by a pressure sensor embedded aboard the watch worn on the wrist of the individual; and
   calculating, using processing circuitry, a height of the jump by differencing a starting altitude corresponding to a last stable pressure measured before the pressure spike and a finishing altitude corresponding to a first stable pressure measured after the pressure spike via the pressure sensor, stable pressure being defined as a pressure whose variations do not exceed 0.1 hectopascals for at least 2 seconds.

2. The method according to claim 1, wherein the detecting a reception includes a sub-step of detecting an acceleration spike of amplitude greater than a second threshold amplitude on the basis of acceleration measurements provided by a three-axis accelerometer embedded aboard the watch, and a sub-step of comparing the instant associated with the acceleration spike and the instant associated with the pressure spike.

3. The method according to claim 2, wherein the second threshold amplitude is greater than 2 g, where g is the acceleration of gravity at the Earth's surface.

4. The method according to claim 1, wherein the first threshold amplitude is greater than 10 hectopascals.

* * * * *